(12) United States Patent
Land et al.

(10) Patent No.: US 7,254,781 B1
(45) Date of Patent: Aug. 7, 2007

(54) METHOD AND APPARATUS FOR PROVIDING MULTIPLE MANAGEMENT INTERFACES TO A NETWORK DEVICE

(75) Inventors: Robert A. Land, Santa Barbara, CA (US); Robert Simon, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/414,298

(22) Filed: Oct. 6, 1999

Related U.S. Application Data

(63) Continuation of application No. 08/684,130, filed on Jul. 19, 1996, now Pat. No. 6,008,805.

(51) Int. Cl.
G06F 17/30 (2006.01)
(52) U.S. Cl. .......................................... 715/760; 726/2
(58) Field of Classification Search ................ 345/335, 345/346, 145, 742–743, 739–741; 709/222, 709/226, 223, 220, 230, 224, 217; 717/11; 715/760, 802, 762, 803, 748, 749; 726/2, 726/12; 707/10, 101; 705/4; 702/188
See application file for complete search history.

(56) References Cited

U.S. PATENT DOCUMENTS

| | | | |
|---|---|---|---|
| 5,657,390 A | | 8/1997 | Elgamal et al. |
| 5,742,762 A | | 4/1998 | Scholl et al. |
| 5,784,597 A | | 7/1998 | Chiu et al. |
| 5,787,483 A | | 7/1998 | Jam et al. |
| 5,825,890 A | * | 10/1998 | Elgamal et al. ................ 380/49 |
| 5,956,487 A | | 9/1999 | Venkatraman et al. |
| 6,008,805 A | * | 12/1999 | Land et al. .................. 345/335 |
| 6,112,235 A | | 8/2000 | Spofford |
| 6,219,708 B1 | * | 4/2001 | Martenson ................... 709/226 |
| 6,374,402 B1 | * | 4/2002 | Schmeidler et al. ........... 717/11 |
| 6,389,464 B1 | * | 5/2002 | Krishnamurthy et al. ..... 709/220 |

(Continued)

FOREIGN PATENT DOCUMENTS

| | | |
|---|---|---|
| WO | WO 94/23514 | 10/1994 |
| WO | WO 95/23469 | 8/1995 |

OTHER PUBLICATIONS

PCT Search Report mailed Sep. 12, 1997 for International Application No. PCT/US 97/11968.
Widl, W., "CCITT Standardisation of Telecommunications Management Networks," 8039 Ericsson Review 68, No. 2, pp. 34-51 (Stockholm 1991).
Larson, A. K., "The Next Web Wave: Network Management," 8178 Data Communications No. 1, pp. 31-32, 34, (Jan. 1996).
Larson, A. K., "Weaving the Management Web," 8178 Data Communications, No. 1, pp. 92, 94 (Jan. 1996).

*Primary Examiner*—Steven P. Sax
(74) *Attorney, Agent, or Firm*—Blakely, Sokoloff, Taylor & Zafman LLP

(57) ABSTRACT

A method and apparatus for managing a network access device is provided. Embedded within the access device are three distinct software layers. The first layer is a combined text-interface generator and Hypertext Transport Protocol client. The second layer is a combined Hypertext Transport Protocol server and Simple Network Management Protocol manager. The third layer is a Simple Network Management Protocol agent that has direct access to the configuration data of the access device. A user can manage the device through the embedded text-interface generator, by using an external HTTP client to communicate with the embedded HTTP server, or by using an external SNMP manager to communicate with the embedded SNMP agent. Techniques are disclosed for embedding SNMP information in messages passed between HTTP clients and servers.

22 Claims, 6 Drawing Sheets

U.S. PATENT DOCUMENTS

| | | | |
|---|---|---|---|
| 6,393,475 B1 * | 5/2002 | Leong et al. | 709/223 |
| 6,457,051 B1 * | 9/2002 | Riddle et al. | 709/224 |
| 6,594,692 B1 * | 7/2003 | Reisman | 709/219 |
| 6,604,104 B1 * | 8/2003 | Smith | 707/10 |
| 6,678,827 B1 * | 1/2004 | Rothermel et al. | 713/201 |
| 6,704,768 B1 * | 3/2004 | Zombek et al. | 709/201 |
| 6,704,873 B1 * | 3/2004 | Underwood | 726/12 |
| 6,718,535 B1 * | 4/2004 | Underwood | 717/101 |
| 7,100,195 B1 * | 8/2006 | Underwood | 726/2 |

* cited by examiner santa-sb# conf t

Enter configuration commands, one per line.
Edit with DELETE CTRL/W, CTRL/U; end with CTRL/Z
interface serial 1
encapsulation ppp
^Z santa-sb# sh int s 1

Serial 1 administratively down, line protocol is down
Hardware is MCI Serial
MTU 1500 bytes, BW 1544 Kbit, DLY 20000 usec, rely 255/255, load 1/255
Encapsulation PPP, loopback not set, keepalive set (10 sec)

Fig. 1
(Prior art)

```
5.1 <filename>.onfo.dat
  1)   frLportCnfEntry      1.3.6.1.4.1.351.100.4.2.1.1.1 Aggregate not-accessible 5.2 <filename>.defs
  1)       frLportCnfEntry        frLportCnfTable.1    Aggregate  not-accessible mandatory
  2)  %ei  frLportCnfEntry        "frLportSlotIndex               frLportPortIndex"
  3)       frLportPortIndex       frLportCnfEntry.1    INTERGER   read-only    mandatory
  4)  %er  frLportSlotIndex       1   32
  5)       frLportPortIndex       frLportCnfEntry.2    INTERGER   read-only    mandatory
  6)  %er  frLportPortIndex       1   32
  7)       frLportClockType       frLportCnfEntry.3    INTERGER   read-write   mandatory
  8)  %ev  frLportClockType       normal    1
  9)  %ev  frLportClockType       looped    2
 10)  %ev  frLportClockType       none      3
 11)       frLportOperStatus      frLportCnfEntry.4    INTERGER   read-only    mandatory
 12)  %ev  frLportOperStatus      inActive  1
 13)  %ev  frLportOperStatus      active    2
 14)  %ev  frLportOperStatus      looped    3
 15)  %ev  frLportOperStatus      failed    4
 16)       frLportPolVerTmr       frLportCnfEntry.5    INTERGER   read-write   mandatory
 17)  %er  frLportPolVerTmr       5    30
 18)  %er  frLportDescrip         frLportCnfEntry.6    Octetstring read-write  mandatory
```

704, 706, 708, 710, 712, 714, 716, 718

EXEMPLARY MIB TEXT FOR A FRAME-RELAY PORT

Fig. 5

METHOD AND APPARATUS FOR PROVIDING MULTIPLE MANAGEMENT INTERFACES TO A NETWORK DEVICE

This application is a continuation of U.S. application Ser. No. 08/684,130, filed Jul. 19, 1996, now U.S. Pat. No. 6,008,805.

FIELD OF THE INVENTION

The present invention relates to network devices, and more specifically, to a method and apparatus for providing multiple management interfaces to a network device.

BACKGROUND OF THE INVENTION

As the "information superhighway" becomes a part of daily life, the task of managing the devices used to convey the digital traffic from one site to another becomes increasingly important. Such devices generally include relatively expensive backbone devices, and relatively inexpensive network devices referred to as access devices. Access devices include, for example, bridges, routers, hubs, and multiplexers. The user interface software used to manage an access device is referred to herein as the management interface to the access device.

Users expect the management interface to a network access device to be navigable, speedy, and safe. With respect to navigability, the interface should enable a novice user to perform routine operations. With respect to speed, the interface should permit a fluent user to meet a network problem with a timely response. With respect to safety, the software providing the management interface should enforce privilege levels and reconfirm commands which will impact service.

Over the past decade, management interfaces evolved from monitor prompts for setting registers, to forms-based dialogs, menuing systems, command languages and "natural language" parsers. A typical interface is accessed over a Telnet connection or by attaching a terminal to a console port on the device. FIG. 1 illustrates a typical command language interface for a router. Text prompts and user hints aid navigability and safety, while fluent users are permitted to issue terse, short-cut commands to enhance speed.

The internal configuration of an access device consists of thousands of bytes of state information at the hardware level. For example, the internal configuration of a typical multi-protocol concentrator consists of 32,000 to 128,000 bytes of state information. A management interface hides some of this complexity by grouping related values together into much smaller number of "configuration variables." A management interface may further simplify the task of managing the device by supplying default profiles or templates for particular applications that will get a device running well enough to allow subsequent tuning.

To provide system managers the power required for some tasks, management software must be capable of altering every byte of state information on a device. If the device is enhanced with a new feature, the management software must be modified to access the hardware, manage a comprehensive set of configuration variables, and provide appropriate defaults. Furthermore, the interface of the management software must continue to be as navigable, fast and safe as the interface was before the enhancements were made. For example, the management software must be updated to prompt with warnings where new configuration options conflict with pre-existing ones.

A significant amount of the software effort involved in expanding the functionality of an existing access device is spent in adapting the management interface and resolving backward-compatibility, navigability and safety issues. Consequently, adding a small feature is seldom a small task. In some cases, release of features requested by customers may be delayed or blocked entirely because of the high cost of modifying and regression-testing the management interface.

As a further complication, users often automate their routine management tasks. When hardware lacks a machine-machine interface, communications scripts access the text interface and parse the responses. A new release of management software that alters the format of a date or the indent level of a menu may be rejected by users who refuse to upgrade because the cost of altering their automated data collection outweighs the benefit of the additional functionality.

To overcome some of the limitations inherent in management interfaces that rely on automated text-based interaction, a Simple Network Management Protocol (SNMP) agent may be embedded within the management software that resides on an access device. An SNMP agent is a computer program that mediates access to the configuration variables of a device through a Management Information Base (MIB). Typically, a user does not interact directly with the SNMP agent. Rather, the user interacts with management software that includes a SNMP manager. The management software containing the SNMP manager does not reside on the same machine as the SNMP agent. Rather, the SNMP manager runs on a workstation which communicates over a network with the SNMP agent according to the SNMP protocol. When SNMP management is used to configure features unique to a device produced by an enterprise, an enterprise-specific MIB is typically created and published to allow automated device management through third-party SNMP manager applications, eliminating the need for scripts.

One benefit of SNMP-based network management is that the workstation-based SNMP manager can specialize in managing the user interface while the on-board SNMP agent can specialize in checking the consistency and safety of user commands. The manager can use this division of labor to advantage, supporting multiple user interfaces of different styles, such as forms, dialogs and graphical displays.

The use of an SNMP manager may also improve the safety of the user interface. For example, where the original logic on-board the device may have warned the user of inconsistencies at the device level (e.g., when a loop-back was requested for a trunk currently in use), a workstation-based SNMP manager, having information about the surrounding network, may provide more sophisticated warnings (e.g., alerting the user that a looped-back trunk is scheduled to carry a teleconference in five minutes). Community names and MIB views may be used to enforce privilege classes for critical operations.

To control what the user of an SNMP manager can do or see, designers have created add-on applications for SNMP managers. Add-on applications are pieces of the device interface which run on a remote platform. Because add-on applications must be designed for a specific SNMP manager on a specific platform, most add-on application developers only support one or a few of the most popular SNMP managers and the most popular platforms. These add-on applications must evolve as the device evolves, track changes in the chosen SNMP Manager(s) API(s), and be ported to new network management platforms that achieve market acceptance. This often consumes disproportionate development resources. The greater the variety of management platforms in use among customers, the worse the drain on development resources.

FIG. 2 illustrates a "bilingual" access device 200 that allows access to configuration data 206 through both a text-based interface 208 and an SNMP agent 210. To access the configuration data 206 through the SNMP agent 210, a network manager interacts with the user interface provided by software containing an SNMP manager 204. The SNMP manager 204, which is typically located on a workstation (network management station 202) separate from but on the same network as access device 200, communicates with the SNMP agent 210 over the network in response to the commands of the user. When network management is performed through the SNMP agent 210, the SNMP manager 204 is mainly responsible for the navigability, network level safety and speed of the interface, while the SNMP agent 210 is mainly responsible for the device-level safety.

The text-based interface 208 provides the network manager or an operator a second access path to the configuration data 206 of the access device 200. Although the text-based interface 208 is typically less sophisticated than the user interface of the SNMP manager 204, the text-based interface 208 resides entirely on the access device and therefore does not require a network connection. Consequently, the text-based interface 208 may be the preferred access path for certain management operations, such as field service and testing.

Although SNMP-based management generally makes the task of managing network devices easier for users and eliminates the worst constraints of the text interface, the use of SNMP-based management adds to the difficulties of system designers. For example, allowing the SNMP agent access to the set of configuration variables previously managed by the text interface compromises the safety of the system. Even if the designer supplies the SNMP agent with all of the safety logic that is explicitly coded into the text interface, some additional safety logic will not be explicitly documented because such logic is simply a side-effect of the interface design. Consequently, new code must be written to ensure safety/consistency and detect race conditions between the two paths allowed to modify the configuration of a single device.

Although re-engineering the access device interface is difficult, maintaining a text-based interface co-equal with an embedded SNMP agent is even more difficult. Safety improves if the SNMP agent is the sole interface to configuration variables. With appropriate add-on software, the interface from a central SNMP manager may be made as fast as a monolithic interface, and the graphical interface of the SNMP manager is more navigable than that of a monolithic interface.

However, eliminating the text-based interface and relying exclusively on control through an SNMP manager has the disadvantage that the access device loses control over navigability and speedy access to its own configuration variables. Such control is lost because an external SNMP manager must mediate the presentation of information to the user.

Users require that access devices be easily configured and managed. As access devices grow more capable and are deployed in more applications, monolithic embedded management software exacts a high development cost, making it difficult to evolve existing products which could otherwise exploit new market opportunities. Hybrid solutions that rely on external management applications, packing SNMP agents and traditional text interfaces into one system, add complexity to the system software and put robustness at risk.

SUMMARY AND OBJECTS OF THE INVENTION

It is desirable to provide an access device that can be configured over a network through an interface that supports Simple Network Management Protocol. It is further desirable to provide an access device that can be configured locally through a text-based interface. Additionally, it is desirable to provide an access device that supports multiple management interfaces but that avoids the complexities and security problems of co-equal configuration access paths. An object is to provide a method and apparatus to address these seemingly incompatible goals.

An access device that supports multiple management interfaces is provided. The management interface of the access device is partitioned into specialized software objects with standardized protocol interfaces. By partitioning the management interface, the management interface may be more easily modified, enhanced, and customized for specific applications.

According to one aspect of the invention, the management interface of an access device combines an embedded SNMP agent to manage the state variables of the system, an on-board SNMP manager whose control interface is an HTTP server, and a text-based HTTP client accessible either via a Telnet connection or a physical console port.

This provides both "text" and "network management station" interfaces that utilize the standard SNMP protocol to access system configuration. Thus, as system software is enhanced, only one interface to the system software need be maintained, making the system software inherently easier to modify, enhance and custom-tailor for specific applications than current architectures.

Other objects, features, and advantages of the present invention will be apparent from the accompanying drawings and from the detailed description that follows below.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates a typical command language interface for a router,

FIG. 5 illustrates entries for a Frame Relay trunk contained in files used by a combined HTTP server/SNMP manager to generate HTML pages for managing the Frame Relay trunk.

DETAILED DESCRIPTION

A method and apparatus for providing a plurality of management interfaces within an access device is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

According to one embodiment, an access device is provided in which an embedded text interface is a client of an embedded SNMP interface. As a client, the text interface does not include routines to access the configuration data of the access device directly. Rather, all access to the configuration data is performed by communicating with the SNMP agent according to the SNMP protocol. Because all access is performed through the SNMP agent, the text interface does not provide a distinct access path to the configuration data. Consequently, the security problems associated with multiple access paths are avoided.

A device that supports an embedded SNMP agent already contains most of the code necessary to implement a simple SNMP manager. For far less development effort than that required to maintain both text and SNMP interfaces side-by-side, it is possible to implement a simple SNMP manager and include it in embedded software. Unlike the add-on applications considered above, the on-board SNMP manager need only keep step with the hardware of the device on which it runs. Unlike the monolithic text-based interface, the SNMP manager browses the MIB using the same SNMP interface as an external management workstation. The SNMP agent code, with sole access to the configuration variables, can unilaterally maintain the hardware in a consistent state.

Figure 2:
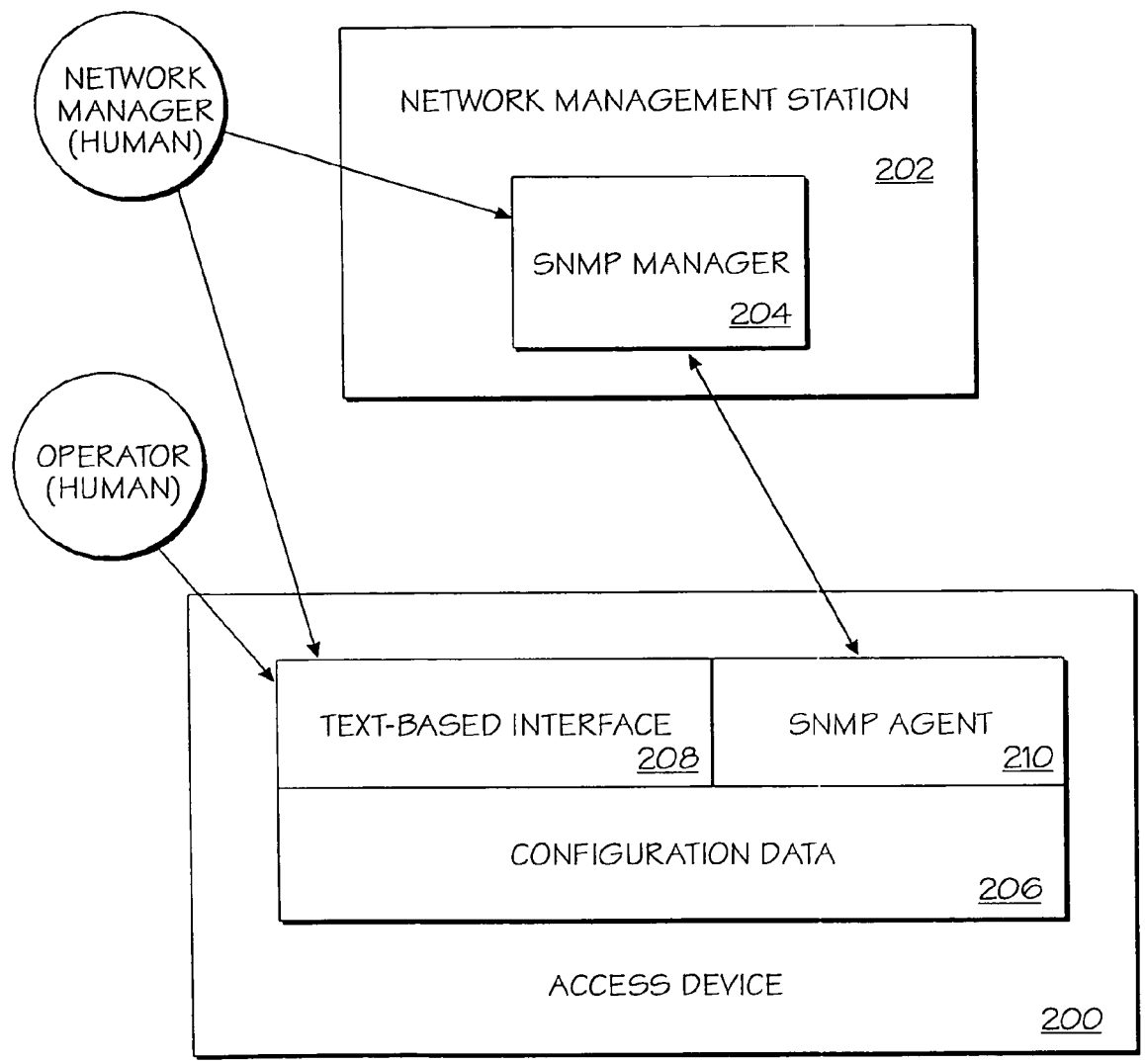
FIG. 2 illustrates a "bilingual" access device that allows access to configuration data through both a text-based interface 208 and an SNMP agent.
Figure 3:
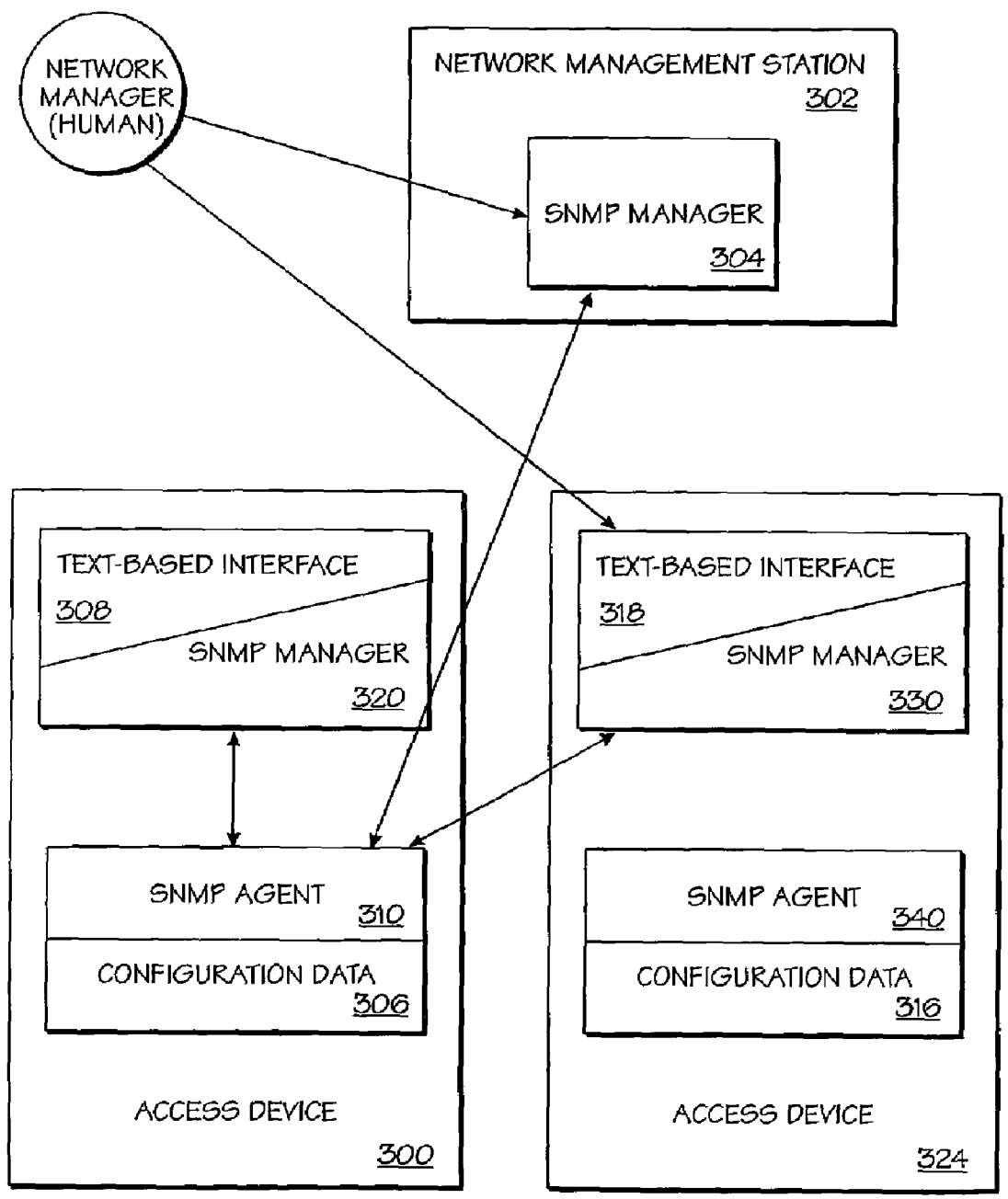
FIG. 3 illustrates a computer network that includes two access devices configured according to an embodiment of the invention.

FIG. 3 illustrates a computer network that includes two access devices 300 and 324 configured according to an embodiment of the invention. Access devices 300 and 324 respectively include configuration data 306 and 316, on-board SNMP agents 310 and 340, and text-based interfaces 308 and 318 combined with SNMP managers 320 and 330.

The multiple-layer interface design of access devices 300 and 324 provides a network manager with multiple options with respect to accessing configuration data. For example, a network manager may configure access device 300 by interacting with the interface provided by an SNMP manager 304 on a remote network management station 302. The SNMP manager 304 communicates with the on-board SNMP agent 310 according to the SNMP protocol, and the SNMP agent 310 performs all direct access to the configuration data 306.

Alternatively, the network manager may interact with the on-board text-based interface 308. In response to user commands issued to the text-based interface 308, the on-board SNMP manager 320 communicates with the on-board SNMP agent 310 according to the SNMP protocol. The SNMP agent 310 performs all direct access to the configuration data 306.

As a third alternative, the network manager may interact with the on-board text-based interface 318 of one access device 324 to configure another access device 300 on the same network. In response to user commands issued to text-based interface 318, the SNMP manager 330 communicates over the network with the SNMP agent 310 of access device 300. Again, all direct access to the configuration data 306 is performed by SNMP agent 310 in response to the SNMP messages that SNMP agent 310 receives.

The on-board SNMP manager 320 of access device 300 is aware of the network and can provide an interface optimized for speed and navigability. The user interface may duplicate the look-and-feel of a text menu system, accessed by telnet or console login to the device. Such an interface guarantees a certain level of speed and navigability for users. However, in this embodiment, add-ons for a proliferating number of dedicated SNMP management workstations are still required to give users graphical access to configuration functions.

Users prefer graphical displays, but it is not economical for a network device to dedicate to its embedded user interface the bandwidth and processing power necessary to drive a graphical user interface, such as an embedded X Windows display. To provide navigability and speed in a graphical environment, an on-board SNMP manager requires a mechanism for retaining control of the data passed through the graphical interface (low resource consumption) while delegating support of the graphics itself (high resource consumption) to the user's workstation. According to an embodiment of the invention, a Hypertext Transport Protocol (HTTP) interface layer is added to access devices to provide this functionality.

HTTP is a platform-independent protocol which separates the task of navigating data from the data itself. Built into the protocol is support for a range of displays from simple text terminals to multimedia workstations. Just as a monolithic management system displays text, the HTTP server presents text that is formatted according to Hypertext Markup Language HTML (also referred to as hypertext). The hypertext produced by an HTTP server is interpreted by an HTTP client (a "browser"). HTML is a combination of plaintext and "tags." Tags are embedded references to additional hypertext or to displayable objects such as bitmaps, sound files, or applications. The tag attributes indicate the type of object associated with the tag. The text that marks the beginning and/or end of a tag is referred to as an anchor. Browsers with varying capabilities interpret tags in different ways.

Figure 4:
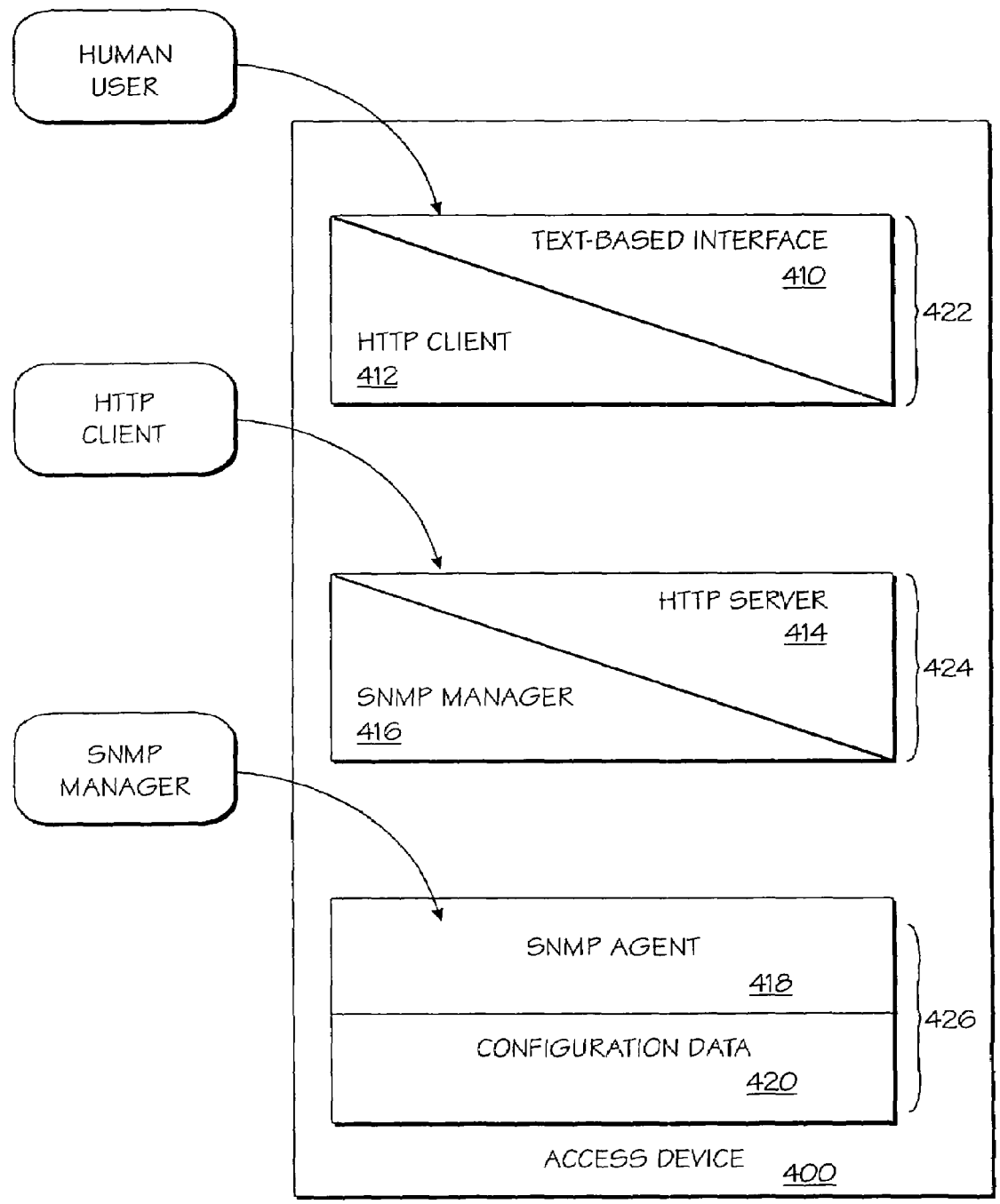
FIG. 4 is a block diagram illustrating an access device 400 with three distinct interface layers according to an embodiment of the invention.

FIG. 4 is a block diagram illustrating an access device 400 with three distinct interface layers 422, 424 and 426, one of which includes an embedded HTTP server 414 according to an embodiment of the invention. Interface layer 426 includes an SNMP agent 418 and is the only interface layer with direct access to the configuration data 420 of the access device 400. Because the SNMP agent 418 is the only module that will directly access the configuration data 420, all of the device-level safety mechanisms may be built into SNMP agent 418 without introducing the security problems inherent in co-equal interfaces.

The SNMP Client Interface Layer

All configuration of access device 400 is performed by communicating with SNMP agent 418 according to the SNMP protocol. For example, a user could interact with an SNMP manager on a network management station. In response to the commands of the user, the SNMP manager sends messages to SNMP agent 418 using the SNMP protocol. In response to the messages, SNMP agent 418 performs changes to the configuration data 420. The SNMP agent 418 transmits responses to the SNMP manager using the SNMP protocol.

Although a network management station is a likely source of the messages received by SNMP agent 418, SNMP agent 418 is not limited to interaction with a network management station. As was explained above with reference to FIG. 3, the SNMP manager used to access SNMP agent 418 may reside within access device 400 itself, or within another access device on the same network as access device 400.

The HTTP Server/SNMP Manager Interface Layer

Interface layer 424 is a combined HTTP server 414 and SNMP manager 416. HTTP server 414 transmits hypertext to HTTP clients that connect to HTTP server 414. The hypertext sent by HTTP server 414 includes text to cause the HTTP client to display a user interface with controls for configuring access device 400.

The user interface may include many layers of hypertext "pages." The initial page generated for an access device is referred to as the "home page" of the access device. Each HTML page typically includes links which, when selected by a user of the HTTP client, cause information embedded in the currently-displayed HTML page to be sent from the HTTP client back to the combined HTTP server/SNMP manager. In response to receiving this information, the combined HTTP server/SNMP manager may perform one or more operations associated with the link. For example, the HTTP server/SNMP manager may execute a script file to "set" an SNMP variable, retrieve the current value for an SNMP variable, and/or generate and transmit additional HTML pages.

The HTML pages display current values from the configuration data 420. SNMP manager 416 communicates with SNMP agent 418 according to the SNMP protocol to obtain the current configuration settings. The HTTP server 414 embeds the values at the appropriate locations within an HTML page and transmits the HTML page to the HTTP client.

An HTTP client generates a user interface in response to the HTML page. A user may interact with the interface provided by the HTTP client to specify a change to configuration data 420. The HTTP client transmits an indication of the user's action to the HTTP server 414 using HTTP protocol. The SNMP manager 416 communicates with SNMP agent 418 according to the SNMP protocol to cause SNMP agent 418 to make the changes specified by the user of the HTTP client.

The information sent back to an HTTP server in response to selection of a link is determined by an "anchor" associated with the link that is stored in the HTML document that contains the link. As shall be explained in greater detail below, a mechanism for storing SNMP information in the anchors within an HTML document is provided. For example, the anchor associated with a link may include a string of numbers that uniquely identify a MIB object associated with the link. When a user selects a link, the SNMP information in the anchor associated with the link is transmitted back to the combined HTTP server/SNMP manager.

The SNMP information sent back when a link is selected may be used as parameter values for a script that is executed in response to selection of the link. For example, the selection of a link associated with a particular MIB object may cause the HTTP client to transmit back to the combined HTTP server/SNMP manager a numeric identifier for the MIB object and a new value for the MIB object. In response, the combined HTTP server/SNMP manager may execute a script which transmits commands to the SNMP agent of a device to cause the configuration data associated with the MIB object to be changed to the specified value.

The SNMP information sent back with the link information may include an identifier for an SNMP row. In response to receiving the identifier for a particular SNMP row, the combined HTTP server/SNMP server queries the SNMP agent for the current values of the configuration data in the SNMP row and generates HTML text for a page to display the values for the selected SNMP row. An exemplary page-generation operation shall be described in greater detail below.

According to one embodiment, the HTTP server puts an HTML anchor for each variable displayed in an HTML page. The anchor for a given variable contains information which specifies what table row is being displayed, the SNMP OID (i.e., Object Identifier) of the variable, and a new value for the variable. If the user selects the link associated with the anchor, the information within the anchor is sent back to the HTTP server. The HTTP server uses the OID and the new value to perform an SNMP "set" operation to set the appropriate configuration data to the new value. The HTTP server then causes the HTTP client to redisplay the page with the new value.

Appendix I includes an exemplary HTML document that may be sent by HTTP server 414 to an HTTP client if access device 400 were a Frame Relay trunk. The HTML document illustrated in Appendix I causes an HTTP client to generate a user interface that enables a user to view and modify configuration parameters of a Frame Relay trunk.

Figure 6:
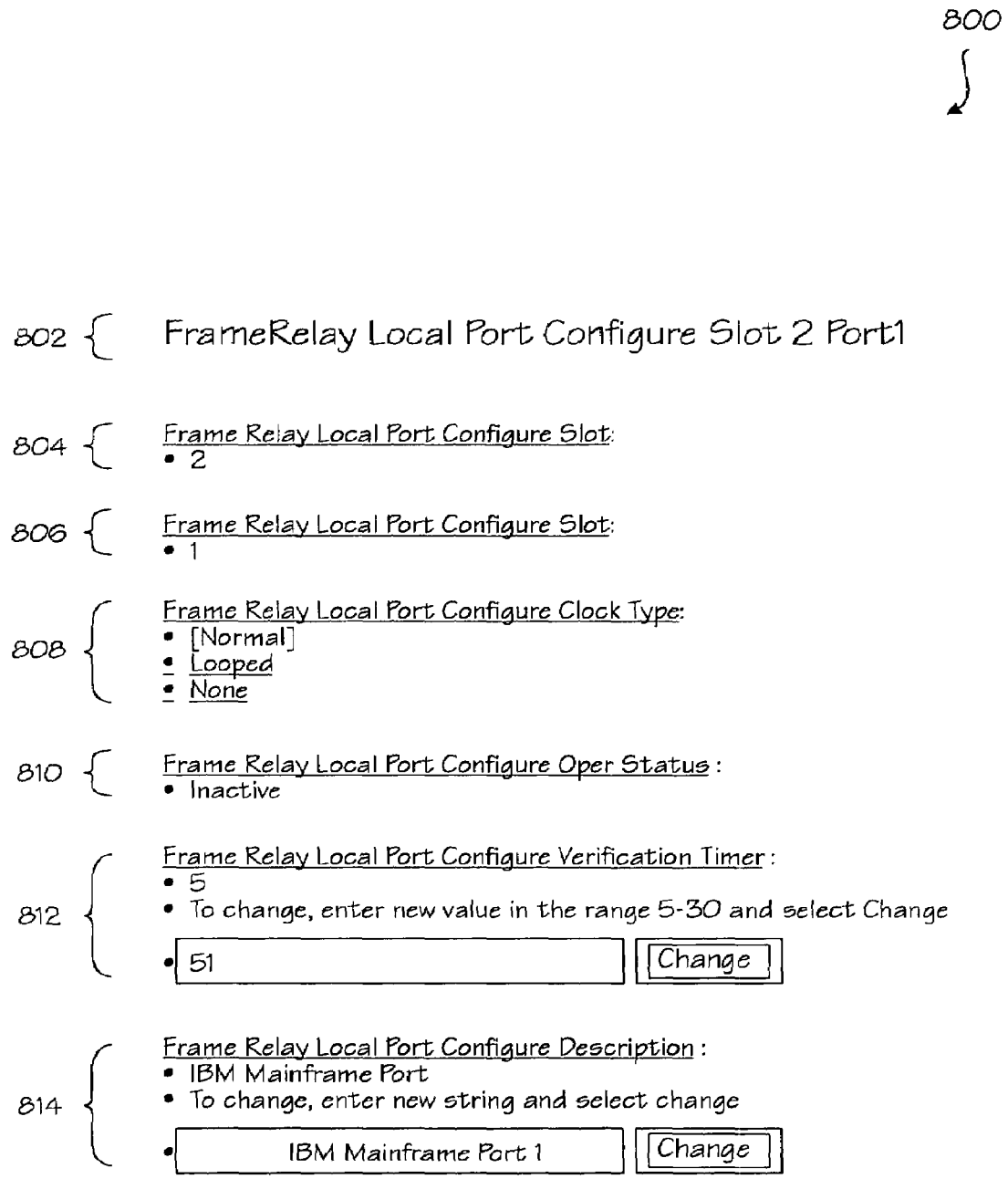
FIG. 6 illustrates the graphical user interface an HTTP client may generate in response to the HTML text generated by an HTTP server/SNMP manager embedded in a Frame Relay trunk.

As mentioned above, the actual interface generated by the HTTP client depends on the capabilities of the HTTP client. For example, a text-based HTTP client will display the text from the HTML fragment and allow the user to make configuration changes via keystrokes. A graphical HTTP client will provide a richer display and allow the user make changes with mouse-clicks. FIG. 6 illustrates the interface that would be generated by a graphical HTTP client in response to receiving a HTML page in Appendix I from HTTP server 414. If the HTTP client is connected to the Internet, the user may request appropriate standards documentation explaining the LMI to be brought on-screen from a repository site.

HTTP server 414 can generate HTML documents that make extremely rich displays of information, like that shown in FIG. 6, available to users. However, the information that may be accessed though the interface is not limited to information stored on access device 400. For example, the hypertext generated by HTTP server 414 may contain tags to data stored in support files elsewhere on the network or on the Internet. Such support files may include, for example, support files for graphical browsing of a product. Such support files might be distributed to customers on tape or CD as an added-cost feature and deployed on a storage server anywhere on the network, allowing the HTTP server interface of any access device on the network to include extensive help or detailed diagrams in its user interface, by means of tags.

HTML supports Hotspots and Common Gateway Interface (CGI) scripts. Hotspots are regions of an image which, when selected by a user, causes an HTTP server to perform specified actions. CGI scripts are scripts that can interact with the HTTP server. The interface generated by the HTTP clients that access HTTP server 414 may allow a user to query and configure access device 400 using intuitive point-and-click techniques. Consequently, network managers are not limited to a specified central SNMP Network Manager.

The graphical interface can be implemented using Hotspots and tags that reference CGI scripts and standard-format bitmap files on a storage-server external to access device 400.

The Text-Based HTTP Client Interface Layer

Interface layer 422 includes a text-based interface 410 and an HTTP client 412. A user may access the text-based interface either via telnet or a physical console port. In response to commands from a user received by the text-based interface, the HTTP client 412 communicates with HTTP server 414 according to HTTP protocol. In response to the messages received by HTTP server 414, SNMP manager 416 communicates with SNMP agent 418 according to the SNMP protocol. In response, the SNMP agent 418 accesses the configuration data 420 to perform the operation specified by the user.

When access device 400 is working and is connected to the network, it may be reconfigured by any HTML browser on the network, as described above. When a hardware, software or configuration problem makes the device unreachable from the workstation through TCP/IP, the embedded text-based browser 422 is an essential fail-safe component of the system software. Configuration, therefore, can involve a maximum of three on-board software objects: the SNMP agent, the SNMP manager/HTTP server and the HTTP client (the browser). The embedded browser uses the same interface to the HTTP server that an external browser would, and, to the SNMP agent, the SNMP manager object is indistinguishable from an external manager. If the device can connect over the network, its text browser can be used to query and configure any neighboring device that supports HTTP.

Enhanced Device Management Interfaces

An access device implementing the architecture illustrated in FIG. 4 is capable of offering services to users that are not presently available on prior art access devices. For example, the HTML document generated by an embedded HTTP server may include links to information at a corporate help desk. The information from the help desk could advise customers at any customer site attempting a particular configuration about problems associated with the particular configuration. The messages from the help desk would appear in the hypertext display that is generated from data sent from the HTTP server embedded in the access device being configured.

The hypertext display that is generated from data sent from an embedded HTTP server could also contain context-sensitive help for network managers. The context-sensitive help could be produced from existing documentation through automatic conversion tools and made available on CD ROM or magnetic tape. Such conversion tools include, for example, LaTeX2html generally available for download from the Computer-Based Learning Unit at the University of Leeds (http://cbl.leeds.ac.uk) and RTFtohtml generally available from available for download from the Cornell Theory Center at Cornell University (http://www.tc.cornell.edu).

The command syntax of any network device with a pure text interface allows some command sequences to be speedier than others. With a configuration interface organized for hypertext browsing, however, a single embedded HTTP server can support multiple interface topologies. Users employing the same type of access device in different applications can control their devices through different browser interfaces by collecting the URLs associated with various sections of the configuration interface into a custom top-level menu called a Home Page. Significantly, the different browser interfaces may be provided in this fashion even though identical code is running on every piece of communication hardware.

Automated Generation of HTML Pages from the MIB

One embodiment of the invention provides an automated translation mechanism that generates HTML pages from the source MIB document. This feature, while not required by the multiple management interface mechanism described herein, adds to the maintainability and extensibility of the system.

According to one embodiment, the automatic page generation mechanism includes a number of scripts which may run on the HTTP server. When executed, these scripts perform the function of reading the browser requests and generating the appropriate SNMP requests, if any, required to respond to the browser requests. The scripts also read files which are output by a MIB compiler, generate the appropriate SNMP to obtain the current MIB parameter values, and generate the HTML pages which display the current MIB values to the user. The generated HTML pages also include interface controls that allow the user to change the MIB values.

One embodiment of the invention employs three specific scripts: mibpage.c, imagemapvar.c and mibscript. Mibpage.c and imagemapvar.c are written in the C programming language, while mibscript is written in the PERL programming language. The names and programming languages of these scripts is merely exemplary. The present invention is not limited to any particular scripts, or any particular programming languages.

The mibpage.c script is used to output manually formatted HTML pages. These manually formatted HTML pages will usually be "home pages", which have links which lead to various sections of the MIB. Mibpage.c performs argument substitution so that later scripts will have information about which specific item is being referenced, for example port 7 or slot 3.

The imagemapvar.c script is used to process image maps. Imagemapvar.c is similar to the conventional scripts for processing image maps, except that imagemapvar.c has the added capability of doing argument substitution.

The mibscript script receives a table row from a MIB. Mibscript then walks through various MIB compiler output files to obtain type and range information for each MIB variable in the row. Mibscript then generates the appropriate SNMP to obtain the current value of the MIB variables. Mibscript then formats hypertext links or form entry boxes, as appropriate, to allow the user to change the value of any of the MIB variables.

In one embodiment, the automatic translation process is simplified by encoding enough information into the hypertext link associated with a given MIB variable that the SNMP object identifier ("SNMP OID") of the variable to be changed, as well as the new value to which it should be changed, are encoded in the URL field of the hypertext link. As a result, the user can select or click on the link, and the URL containing the information needed to perform the SNMP "set" operation will be sent back to the HTTP server. By sending this information to the HTTP server in this manner, the script file receiving this URL can perform the SNMP "set" request without having any specific knowledge of the variable being changed or the semantics of the new value.

One embodiment of the automatic translation from MIB to HTML involves some extensions to the HTML conventions in order to impose a structure onto how the MIB information is encoded into the HTML language elements. Prior to explaining specific extensions to HTML conventions, a brief description of some of the principles and conventions of HTML will be given.

HTML

In general, an HTTP server can send text to a browser, which the browser will format and display. In addition to the text that is displayed by the browser, HTML also supports anchors, imagemaps, scripts and forms. Each of these components shall be described in greater detail below.

An anchor is a set of information consisting of (1) a text string or picture, and (2) a file name which is to be accessed if the text string or picture is selected. Anchors are used to describe the next "file" to be accessed, reflecting the "state" of the session. Anchors are also commonly referred to as hypertext links.

An imagemap is a picture which is specially configured so that the pixels where the user clicks will be sent back to the server. Specifically, when a region of an imagemap is selected, a browser sends to the HTTP server a string (stored in argv[1]) that identifies the region of the imagemap that was selected.

A script is a program which may be executed (or interpreted) on the server system. Typically, scripts are used to process input and format output. For example, when a region of an imagemap is selected, the HTTP server may use a script to process the click pixels and decide on the next HTML file to use. Scripts are often identified by their path name.

According to HTML convention, the path name of the script files for an HTTP server begins with /cgi-bin/. When a path with /cgi-bin/ is detected, the HTTP server executes the file /cgi-bin/<executable>. If the specified "next file" is cgi-bin/<executable>/<a>/<b>/<c> where a, b and c are any string which comprise a legal filename, the /<a>/<b>/<c> will be passed as an environment variable to the script. The script may process the filename before opening the file. Thus part or all of the filename may be other state information not related to a file name.

Some of the HTML display may comprise a form. A form consists of various types of buttons and text fields. Each button is assigned a NAME and a VALUE string. Each text field is assigned a NAME and the user supplies a VALUE string by typing text into the text field. The server may pre-enter text into the VALUE field of a text field. Form information is sent back to a script. The name of the script that receives the form information is specified in the HTML "form" statement. As described above, the script may be specified as /cgi-bin/<executable>/<a>/<b>/<c>. The form information will be returned in the form <name>=<value> for every text field on the page, and for every button which is "pressed" or selected.

Extensions to Html

As mentioned above, in one embodiment of the invention, extensions were added to a conventional HTML server to facilitate its use in an embedded SNMP-HTML system. These extensions are implemented in script files which are part of the HTML-SNMP system. These scripts implement inline commands, parameters, parameter substitution and random number substitution. Each of these extensions shall be described in greater detail below.

As stated above, the format of the file string passed to a script file may be modified to pass additional information. It is then up to the script file to unmodify the file name in order to be able to access the desired file. According to one embodiment of the invention, the filename is modified in systematic ways to allow additional information to be passed between the HTTP server and HTTP client. One technique for modifying the filename is by appending inline commands to the filename. According to one embodiment, these inline commands begin with a /- followed by the specified command (optionally with the command's arguments) and are terminated by the next/character (or the end of the file name). Some examples of the use of the inline commands are /-conf, /-newkey /-args and /-rnd. These inline commands are described in more detail hereafter.

According to one embodiment of the invention, the SNMP-HTML system is also modified to allow the use of general arguments. General arguments are used to pass the current "state" of various values from the HTTP client back to the HTTP server. These general arguments are used as call-by-value numeric subroutine parameters. These parameters specify which specific MIB item is referenced, for example slot 7 or port 1. As a further example, slot 3 port 2 would cause the arguments 3 and 2 to be passed as the general arguments to the "configure port" page.

Arguments may be specified in one of two formats. Specifically, arguments may either appear at the end of the file name, as a dot separated list, or as a /-args command with a dot separated list. The following are examples of arguments for an input to the configure-framerelay-connection page for slot 3 port 2 DLCI 100:

/cgi-bin/mibpage/<dir>/<file>/-<other_command>/-<other_command>/3.2.100

/cgi-bin/mibpage/<dir>/<file>/-<other_command>/-args3.2.100/-<other_command>

/cgi-bin/mibpage/<dir>/<file>/-<other_command>/-args.3.2.100/-<other_command>

When arguments are passed into the server script, the server script makes use of those arguments through argument substitution. As described above, both the mibpage.c and the imagemapvar scripts perform this substitution. As the server script reads the .html or .map file, the server script will look for $<number>. The server script will substitute argument <number> for that string. Thus for the above situation, the title or banner section of the .html or .map file to configure the frame relay connection could be:

Configure Card $0 Port $1 Connection DLCI $2

Argument substitution also works in passing arguments to the next page. For example, an anchor's file specification on the configure frame relay connection page might invoke a configure connection attribute page passing on the same arguments that the configure frame relay connection page was passed using:

/cgi-bin/mibpage/<dir>/config_frconn_attrib.mibpg/$0.$1.$2

Using the techniques described above for argument substitution, a string $R in a .html or .map file will be replaced with the number of seconds since Jan. 1, 1980 (effectively a random number). Because browsers often cache pages that have previously been sent to the browser, it is possible for a browser to present the user with outdated information. The ability to substitute random numbers is used to ensure that browsers do not provide the user with outdated configuration information. Specifically, by adding a random number to the file specification, the file specification will always look like a different file to the browser. Consequently, the browser will always request a new copy of a page from the server, rather than using the old copy from the browser's cache. Note that clicks on imagemaps are always sent back to the server, so mapfile paths need not have random numbers in them. The files listed in the map file, however, should use random numbers.

Exemplary Inline Commands

According to one embodiment of the invention, an embedded HTTP server/SNMP manager such as interface layer 424 supports the following inline commands:

/-rnd<random_number>—this command is used to hold a random number as part of the filename. This field is stripped off the end of the file name, but is otherwise ignored. This command only provides a place for the random number to appear in the file name.

/-conf<dot separated string>/or /-conf-get/—The conf command is used to tell the mibscript script that the script should perform an SNMP "set" operation that the user has requested before the script generates any new output. This command is used when a user has requested that the item whose object identifier (OID) is passed as the dot separated string should be set to the value which is the last dotted item. The /-conf-get format shows that the configuration item will be passed as a "GET" style form so the mibscript script should read and parse the input (as environment variable QUERY_STRING). The /-conf-get is used when there is a form on the screen. The forms are generated by the mibscript script based on MIB information. The fields sent back from the browser handling the form will be of the format s<dot separated list>=<value> or n<dot separated list>=value based on whether the item is supposed to be a string item or a numeric item.

/-newkey-<field name>-<oid>/—The new key command tells the mibscript script not to read any file, but to generate a form to allow the user to enter a new numeric key. A key is the indexing item to a table row, and the new key command allows the user to generate a new row in the table. The new key command used to generate a new row in a table which can have a variable number of rows, for example, a table that lists connections on a port. Each new connection is keyed by it's local end DLCI, which, being the local end frame relay address of the connection, provides a unique numeric value for each connection. The new key command will generate the form to allow the user to enter a new DLCI. The file specified with the newkey command is not opened, but the same filename is passed as the file to reference when the form is sent back to the HTTP server for parsing.

When the new-key resulting form is filled in by the user and sent back to the HTTP server, a number of operations are performed. First, the new row is created if it did not exist. In one embodiment, the new row is created by setting an unused column in that row to a fixed value. Then the configure page for that item is invoked, with the parameter list that was included with the /-newkey command. The new key value that the user entered is appended to the parameter list.

/-args—provides one way of specifying general arguments for the current page being displayed. An alternative way of specifying the arguments is to append the arguments on to the end of the file name as a dotted string of numbers as described previously. If there are no parameters, the /-args notation must be used, since there is no way to specify no parameters using the "appending" technique.

/-back—specifies where the backlink should point. The rest of the URL specifies the URL backlink, including the /-args for the backlink. The /-back inline command is useful to allow a level or a cgi script to construct the backlink for areas to which it links the user.

/-definition—identifies a request for the server to display the text of the description field of the MIB source file for the given object name.

Management Information Base Format

A combined HTTP server/SNMP manager must be able to translate requests and responses between the HTTP protocol and the SNMP protocol. In the SNMP protocol, the configuration data of network devices is accessed by requesting operations to be performed on objects identified in Management Information Base (MIB) structures. FIG. 5 illustrates a portion of an exemplary MIB structure for a frame-relay-port.

MIB structures are composed of MIB variables and tables. Each MIB table may be represented as a table of rows and columns where the rows represent the instances of objects, and the columns represent individual configurable parameters. A table row represents a group of parameters and status for a certain configurable object in a system. For example, a table row could be used to hold all parameters and status for a frame-relay-port, or an ATM-port. A MIB table corresponding to the MIB text shown in FIG. 5 could be represented as a table with some of the columns and rows shown in Table 1.

TABLE 1

| Instance (slot.port) | ClockType (.3) | OperStatus (.4) | VerficationTimer (.5) | Description (.6) |
| --- | --- | --- | --- | --- |
| 1.1 | | | | |
| 1.2 | | | | |
| 1.3 | | | | |
| 2.1 | | | | |

Each Table has an object identifier (OID) which can be expressed as A.B.C. A table entry has an OD A.B.C.1. The "1" being appended based on SNMP convention. For example, a specific table entry for a specific frame-relay-port will have the OID A.B.C.1.col.row1 . . . rown. In Table 1, two indexes (slot.port) are used to specify each instance.

Each cell (i.e. each configurable parameter) of Table 1 would have an OID of A.B.C.col.row1.row2. Thus, clocktype for port 2.1 has an OID of A.B.C.3.2.1.

MIB Value Formats

The cells of a MIB table may hold different types of values. The most common type of values for configuration variables are integers and octet-strings. Integer values may be of two types, a pure number (which may have a low and high bound) and a list of number/value (enum) pairs. The enum pairs are used to assign meaningful labels to values. For example, ClockType for a frame relay port will have the values:

| Value | Name |
|---|---|
| 1 | Normal |
| 2 | Looped |
| 3 | None |

Thus, an integrated HTTP server/SNMP manager preferably supports three general types of configurable or status values: Integer (with or without a range), Integer with enum list of names and values, and Octet Strings. For the purposes of explanation, it shall be assumed that the columns illustrated in Table 1 hold values of the types indicated in Table 2.

TABLE 2

| Column | Type | Permitted values | Configurable | OID |
|---|---|---|---|---|
| ClockType | Integer Enum (name/value pairs) | 1 Normal<br>2 Looped<br>3 None | yes | A.B.C.1.3.slot.port |
| OperStatus | Integer Enum | 1 Inactive<br>2 Active<br>3 Looped<br>4 Failed | no | A.B.C.1.4.slot.port |
| VerificationTimer | Integer Range | Range 5–30 | yes | A.B.C.1.5.slot.port |
| Description | Octet-String | n characters | yes | A.B.C.1.6.slot.port |

HTML Pages

According to one embodiment of the invention, the integrated HTTP server/SNMP manager transmits "pages" of HTML text to HTTP clients to cause the clients to display the current configuration data of the access device on which the HTTP server resides and to allow the user to specify changes to the configuration data. Each page of html is a presentation of a configurable or statusable object. According to one embodiment, each page of HTML generated by the integrated HTTP server/SNMP manager contains one table row of information.

According to one embodiment, each page has several sections. Each section displays information associated with one configurable parameter or one status item. Specifically, each section includes the name of the item and the current value of the item. If the item is a configurable item composed of enum name/value pairs, then the section will also include the names of the available settings. If the item is a configurable item which is a number range or an octet-string, then the section will include a form entry that initially contains the current setting.

According to one embodiment, the item name is a hypertext link to the definition of the item. The names of the potential settings for enum name/value pairs are hypertext links which, when selected, will actually cause that setting to become the current setting. In response to a user entering a new value in a form entry, or selecting a "Change" button associated with a form entry, the configuration data associated with the form entry is set to the new value in the form entry. FIG. 6 illustrates the display generated by an HTTP client in response to receiving an HTML page from an HTTP server embedded in a device with a Frame-Relay port.

HTTP Server/SNMP Manager Operation

According to one embodiment, a combined HTTP server/SNMP manager generates HTML text for an access device based on (1) information from an SNMP client embedded in the device and (2) information contained in files "<filename>info.dat" and "<filename>.defs" generated by the SMIC-SNMP MIB Information Compiler available from Carnegie Mellon University and other sources. FIG. 5 shows the information contained in these two files that was used to generate the display shown in FIG. 6. The operations performed by a combined HTTP server/SNMP manager to generate the HTML text that produced that screen display illustrated in FIG. 6 shall now be described.

Initially, the combined HTTP server/SNMP manager receives from the HTTP client a request to display the table entry for Frame-Relay-Local-Port-Configure-Entry with indexes 2,1. The MIB name for the requested entry is frLportCnfEntry. In response to the request, the combined HTTP server/SNMP manager finds and reads the line from the file "<filename>info.dat" that indicates the OID for the indicated table item. In the present example, the OID for frLportCnfEntry is 1.3.6.1.4.1.351.100.4.2.1.1.1. The line 704 in FIG. 5 is the line in <filename>info.dat that indicates the OID for frLportCnfEntry.

Once the OID of the target table entry is determined, the OID is used to find and read the lines from the file "<filename>.defs" which contain information about the table entry. In the present example, the lines in "<filename>.defs" that correspond to frLportCnfEntry include lines 706, 708, 710, 712, 714 and 716.

Based on the information contained in lines 706, the combined HTTP server/SNMP manager determines that there are 2 indexes, Port Index, and Slot Index, associated with frLportCnfEntry. The combined HTTP server/SNMP manager processes the entry name frLportCnfEntry by adding spaces before each word, and replacing some abbreviations with their equivalent words. At this point, the combined HTTP server/SNMP manager may generate the HTML text which produces the banner line 802 of screen display 800.

The combined HTTP server/SNMP manager continues searching the <filename>.defs file for entries which contain frLportCnfEntry.<number>. These entries constitute columns within the MIB table. In the present example, the combined HTTP server/SNMP manager next encounters lines 708 in the <filename>.defs file.

Based on the index values that were received from the HTTP client as part of the request, the combined HTTP server/SNMP manager knows that the value of the first index is 2. The combined HTTP server/SNMP manager processes the column name by adding spaces and expanding abbreviations. The combined HTTP server/SNMP manager then generates the HTML text that will cause an HTTP client to display the column name along with its associated value. Section 804 of screen display 800 illustrates the display that may be generated by an HTTP client in response to this HTML text.

In the illustrated display 800, the column name (e.g. "Frame Relay Local Port Configure Slot") is displayed as a hypertext link. According to one embodiment, a user may click on the name of a column to retrieve the definition of the column. Pseudo-code to create such a hypertext link for the "Frame Local Port Configure Slot" column name is:

<A  HREF="/cgi-bin/mibscript  Display_Definition frLportSlotIndex">Frame Relay Local Port Slot Index: </A>

Using correct HTML syntax, the HTTP server would generate:

<A  HREF="/cgi-bin/mibscript/frLportSlotIndex/-defintion">Frame Relay Local Port Slot Index: </A>

The HTTP server would then generate the following text to list the value:

<UL>
<LI>2
</UL>

The procedure described above for generating the HTML text for the first index is repeated for all subsequent indexes. In the present example, lines 708 are the next two lines with frLportCnfENtry.<number> from the <filename>.defs file. Based on the information contained in lines 708, the combined HTTP server/SNMP manager generates the following HTML text:

<A  HREF="/cgi-bin/mibscript/frLportSlotIndex/-defintion">Frame Relay Local Port Port Index: </A>

The value of the "port" index (i.e. 1) was received from the HTTP client as part of the initial request. To list the value of the port index, the combined HTTP server/SNMP manager generates the HTML text:

<UL>
<LI>1
</UL>

In response to this HTML text, an HTTP client would generate section 806 of screen display 800.

The four lines (lines 712) in the <filename>.defs file that follow the lines for the Port index column (lines 710) correspond to another field ("frLportClockType") in the MIB table. Note that the % e lines immediately follow the main entry line. Based on lines 712, the combined HTTP server/SNMP manager determines that the value associated with the frLportClockType field is an integer value, with name value pairs. The OID of the frLportClockType field is the OD of the frLportCnfEntry that was previously read from the <filename>info.dat file, with .col.slot.port appended the end. Thus, the OID for the frLportClockType field is 1.3.6.1.4.1.351.100.4.2.1.1.1.col.slot.port, or 1.3.6.1.4.1.351.100.4.2.1.1.1.3.2.1. The value for the frLportClockType field is configurable (writable).

The combined HTTP server/SNMP manager sends a query to the SNMP agent to retrieve the current value for the frLportClockType field. For the purpose of explanation, it shall be assumed that the SNMP agent returns the value "1." The combined HTTP server/SNMP manager generates hypertext to display the name of the frLportClockType field using the name expansion techniques described above. The combined HTTP server/SNMP manager also generates HTML text to list the three possible values for the field, where the current value is displayed in boldface. The following is pseudo-code to generate the two possible values that are not the current value:

<A  HREF="/cgi-bin/mibscript/  configure 1.3.6.1.4.1.351.100.4.2.1.1.1.3.2.1 to 2, then display frLportCnfEntry (2,1) again">Looped</A>
<A  HREF="/cgi-bin/mibscript/  configure 1.3.6.1.4.1.351.100.4.2.1.1.1.3.2.1 to 3, then display frLportCnfEntry (2,1) again">None</A>

Actual HTML code to perform this operation is:

<A  HREF="/cgibin/mibscript/frLportEnrtry /-conf1.3.6.1.4.1.351.100.4.2.1.1.1.3.2.1.2/-args2.1">Looped</A>
<A  HREF="/cgi-bin/mibscript/frLportEnrtry /-conf1.3.6.1.4.1.351.100.4.2.1.1.1.3.2.1.3/-args2.1">None</A>

Consequently, the entire block of HTML text generated by the HTTP server to display the interface for the frLportClockType field is:

<A  HREF="/cgi-bin/mibscript/frLportClockType/-defintion">Frame Relay Local Port Clock Type: </A>
<UL>
<LI><STRONG>[Normal]</STRONG>
<LI><A  HREF="/cgi-bin/mibscript/frLportEnrtry /-conf1.3.6.1.4.1.351.100.4.2.1.1.1.3.2.1.2/-args2.1">Looped</A>
<LI><A  HREF="/cgi-bin/mibscript/frLportEnrtry /-conf1.3.6.1.4.1.351.100.4.2.1.1.1.3.2.1.3/-args2.1">None</A>
</UL>

Section 808 of screen display 800 is an example of the interface that an HTTP client would generate based on this HTML code.

The lines 714 in the <filename>.defs file that follow the lines related to the frLportClockType (712) correspond to an item entitled "OperStatus." The information contained in lines 714 indicate that the data type for OperStatus is also name value pairs, but that OperStatus is a status item, and is not writable. The combined HTTP server/SNMP manager queries the SNMP agent to get the current value for the OperStatus item. It shall be assumed that the SNMP agent returns the value "1." The combined HTTP server/SNMP manager generates HTML code to display the name and current value of the OperStatus item. In the present example, the HTML code may be:

<A  HREF="/cgi-bin/mibscript/frLportOperStatus/-definition">Frame Relay Local Port Oper Status: </A>
<UL>
<LI>Inactive
</UL>

Because the OperStatus item is not writable, the combined HTTP server/SNMP manager does not generate HTML text to allow the user to select an alternate value for the OperStatus item. Section 810 of screen display 800 represents the information that could be displayed by an HTTP client in response to this code.

The lines 716 in the <filename>.defs file that follow the lines related to the OperStatus item (lines 714) contain frLportCnfEntry.<number> and correspond to an item entitled "frLportPolVerTmr." The information in lines 716 indicates to the combined HTTP server/SNMP manager that the frLportPolVerTmr item is an integer with a valid range of 5-30. The OID of the frLportPolVerTmr item for relevant row is 1.3.6.1.4.1.351.100.4.2.1.1.1.5.2.1. The combined HTTP server/SNMP manager transmits a query to the SNMP agent to retrieve the current value of the frLportPolVerTmr item. In the present example, the current value is 5. The combined HTTP server/SNMP manager generates HTML text to create a form block and a form entry which says:

```
<FORM METHOD="get" ACTION="configure" (read
    form input and configure from it using the "get" form
    reading method) then display frLportCnfEntry(2,1)>
<INPUT NAME="When this is sent back, set integer
    1.3.6.1.4.1.351.100.4.2.1.1.1.5.2.1 to the value the user
    entered" INITIAL_VALUE="5">
<INPUT TYPE="submit" NAME="Change">
```

The actual HTML text generated by HTTP server would be:

```
<FORM ACTION="/cgi-bin/mibscript/frLportCnfEntry/-
    conf-get/-args2.1" METHOD="get">
<INPUT NAME="n1.3.6.1.4.1.351.100.4.2.1.1.1.5.2.1"
    TYPE="text" VALUE="5">
<INPUT TYPE="submit" NAME="Change">
<A HREF="/cgi-bin/mibscript/frLportPolVerTmr/-
    defintion">Frame Relay Local Port Pol Ver Timer:
    </A>
<FORM ACTION="/cgi-bin/mibscript/frLportCnfEntry/-
    conf-get/-args2.1" METHOD="get">
<UL>
<LI>5
<LI> To change enter new value in the range 5-30 and
    select Change
<LI><INPUT
    NAME="n1.3.6.1.4.1.351.100.4.2.1.1.1.5.2.1"
    TYPE="text" VALUE="5">
<INPUT TYPE="submit" NAME="Change">
</UL>
```

Section 812 of screen display 800 represents the information that could be displayed by an HTTP client in response to this code.

The line (line 718) in the <filename>.defs file that follows the lines 716 related to the frLportPolVerTmr item corresponds to an item entitled "frLportDescrip." The frLportDescrip item has no % e lines. The information in line 718 indicates to the combined HTTP server/SNMP manager that the frLportDescrip item is a description field which is configurable, and that the value type of the field is an octet string. The HTML text used to handle octet string is similar to that used for integers, except that the input field of the form is called "s<oid>" instead of "n<oid>" to indicate that the input field should be treated as a string instead of a number. Also, a <FORM>command is not needed, since one was emitted for the previous section, and only one <FORM> command is needed per HTML page. The specific HTML text generated by the HTTP server for the frLportDescrip item is:

```
<A HREF="/cgi-bin/mibscript/frLportDescrip/-
    defintion">Frame Relay Local Port Descrip: <A>
<UL>
<LI>5
<LI>To change enter new string and select Change
<LI><INPUT
    NAME="s1.3.6.1.4.1.351.100.4.2.1.1.1.6.2.1"
    TYPE="text" VALUE="IBM Mainframe Port">
<INPUT TYPE="submit" NAME="Change">
</UL>
```

Section 814 of screen display 800 represents the information that could be displayed by an HTTP client in response to this code.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX I

```
<HTML><HEAD><TITLE>FrameRelay Local Port Configure
Slot 2 Port 1</TITLE></HEAD>
<BODY><H2>FrameRelay Local Port Configure Slot 2
Port 1 <H2><HR>
<A HREF=
"/cgi-bin/mibscript/frLportSlotIndex/-definition">Frame Relay Local Port
Slot Index: </A>
<UL>
<LI>2
</UL>
<A HREF=
"/cgi-bin/mibscript/frLportSlotIndex/-definitoin">Frame Relay Local Port
Port Index: </A>
<UL>
<LI>1
</UL>
<A HREF=
"/cgi-bin/mibscript/frLportClockType/-definition">Frame Relay Local Port
Clock Type: </A>
<UL>
<LI><STRONG>[Normal]</STRONG>
<LI><A HREF=
"/cgi-bin/mibscript/
frLportEnrtry/-conf1.3.6.1.4.1.351.100.4.2.1.1.1.3.2.1.2/-args2.1"
>Looped</A>
<LI><A HREF=
"/cgi-bin/mibscript/
frLportEnrtry/-conf1.3.6.1.4.1.351.100.4.2.1.1.1.3.2.1.2/-args2.1"
>None</A>
</UL>
<A HREF=
"/cgi-bin/mibscript/frLportOperStatus/-definition">Frame Relay Local Port
Oper Status: </A>
<UL>
<LI>Inactive
</UL>
<A HREF=
"/cgi-bin/mibscript/frLportPolVerTmr/-definition">Frame Relay
Local Port Pol Ver Timer: </A>
<FORM ACTION=
"/cgi-bin/mibscript/frLportCnfEntry/-conf-get/-args2.1"
METHOD="get">
<UL>
<LI>5
<LI>To change enter new value in the range 5-30 and select Change
<LI><INPUT NAME=
"n1.3.6.1.4.1.351.100.4.2.1.1.1.5.2.1" TYPE="text" VALUE="5">
<INPUT TYPE="submit" NAME="Change">
</UL>
<A HREF=
"/cgi-bin/mibscript/frLportDescrip/-definition">Frame Relay Local Port
Descrip: </A>
<UL>
<LI>5
```

APPENDIX I-continued

```
<LI>To change enter new string and select Change
<LI><INPUT NAME=
"s1.3.6.1.4.1.351.100.4.2.1.1.1.6.2.1" TYPE="text"
VALUE="IBM Mainframe Port">
<INPUT TYPE="submit" NAME="Change">
</UL>
</FORM></BODY></HTML>
```

What is claimed is:

1. An access device comprising:
a text-based interface layer to a combined text-based interface generator and hypertext transport protocol (HTTP) client;
an HTTP server interface layer to a combined HTTP server and simple network management protocol (SNMP) manager; and
an SNMP agent interface layer to a SNMP agent, wherein the SNMP agent generates a user interface and receives user input that specifies a change to configuration data stored in said access device and said SNMP agent transmits a first message to the combined hypertext transport protocol (HTTP) server and SNMP manager using HTTP;
the combined HTTP server and SNMP manager, wherein the combined HTTP server and SNMP manager only accesses said configuration data by communicating with said SNMP agent and wherein in response to said first message, said combined HTTP server and SNMP manager transmits a second message to the combined text-interface generator and HTTP client using SNMP; and
the combined text-interface generator and HTTP client, wherein the combined text-interface generator and HTTP client only accesses said configuration data in response to said second message as specified by said user input by requesting said combined HTTP server and SNMP manager to communicate with said SNMP agent, so that all safety mechanisms are built into the SNMP agent to enhance security and wherein said text-based interface layer, said HTTP server interface layer and said SNMP agent interface layer reside in the access device.

2. The access device of claim 1, wherein:
the combined HTTP server and SNMP manager generates hypertext mark-up language (HTML) documents that include anchors that contain identifiers for management information base (MIB) objects; and
the combined text-interface generator and HTTP client transmits to the combined HTTP server and SNMP manager messages that contain identifiers for MIB objects in response to input received from a user.

3. A network device comprising:
means for providing a text-based interface to a combined text-based interface generator and hypertext transport protocol (HTTP) client;
means for providing an HTTP server interface to a combined HTTP server and simple network management protocol (SNMP) manager; and
means for providing an SNMP agent interface layer to a SNMP agent to receive user input that specifies a change to configuration data stored in said network device and said SNMP agent to transmit a first message to a means for combining hypertext transport protocol (HTTP) server and SNMP manager using HTTP;
said means for combining HTTP server and SNMP manager, wherein the means for combining HTTP server and SNMP manager only accesses said configuration data by communicating with said SNMP agent and wherein in response to said first message, said means for combining HTTP server and SNMP manager to transmit a second message to a means for combining text-interface generator and HTTP client using SNMP; and
said means for combining text-interface generator and HTTP client, wherein the means for combining text-interface generator and HTTP client to only access said configuration data in response to said second message as specified by said user input by requesting the means for combining HTTP server and SNMP manager to communicate with said SNMP agent, so that all safety mechanisms are built into the SNMP agent to enhance security and wherein said means for providing said text-based interface layer, said HTTP server interface and said SNMP agent interface reside in said network device.

4. The network device of claim 3, wherein:
the means for combining HTTP server and SNMP manager generates hypertext mark-up language (HTML) documents that include anchors that contain identifiers for management information base (MIB) objects; and
the means for combining text-interface generator and HTTP client transmits to the means for combining HTTP server and SNMP manager messages that contain identifiers for MIB objects in response to input received from a user.

5. The network device of claim 3, further comprising a user interface, said interface being optimized for speed and navigability.

6. The network device of claim 5, wherein the user interface is a duplicate in look-and-feel of a text menu system.

7. A computer readable medium containing executable instructions which, when executed in a processing system, causes the system to perform the following comprising:
provide a text-based interface layer to a combined text-based interface generator and hypertext transport protocol (HTTP) client;
provide an HTTP server interface layer to a combined HTTP server and simple network management protocol (SNMP) manager; and
provide an SNMP agent interface layer to SNMP agent, wherein the SNMP agent is configured to generate user input that specifies a change to configuration data stored in said access device and said SNMP agent is configured to transmit a first message to a combined hypertext transport protocol (HTTP) server and SNMP manager using HTTP;
provide a combined HTTP server and SNMP manager, wherein the combined HTTP server and SNMP manager is configured to only access said configuration data by communicating with said SNMP agent and wherein in response to said first message, the combined HTTP server and SNMP manager is configured to transmit a second message to a combined text-interface generator and HTTP client using SNMP; and
provide a combined text-interface generator and HTTP client, wherein the combined text-interface generator and HTTP client is configured to only access said configuration data in response to said second message as specified by said user input by requesting said combined HTTP server and SNMP manager to communicate with said SNMP agent, so that all safety mechanisms are built into the SNMP agent to enhance security and wherein said a text-based interface layer, said HTTP server interface layer and said SNMP agent interface layer reside in said computer readable medium.

8. The computer readable medium of claim 7 wherein:
the combined HTTP server and SNMP manager generates hypertext mark-up language (HTML) documents that include anchors that contain identifiers for management information base (MIB) objects; and
the combined text-interface generator and HTTP client transmits to the combined HTTP server and SNMP manager messages that contain identifiers for MIB objects in response to input received from a user.

9. The computer readable medium of claim 7, wherein the method further comprises providing a user interface, said interface being optimized for speed and navigability.

10. The computer readable medium of claim 9, wherein the user interface is a duplicate in look-and-feel of a text menu system.

11. The access device of claim 1, wherein the text-based interface layer does not provide direct access to the configuration data.

12. An apparatus, comprising:
one or more access devices, each of the one or more access devices comprising:
a text-based interface layer to a combined text-based interface generator and hypertext transport protocol (HTTP) client;
an HTTP server interface layer to a combined HTTP server and simple network management protocol (SNMP) manager;
a SNMP agent interface layer to a SNMP agent, wherein the SNMP agent generates a user interface and receives user input that specifies a change to configuration data stored in said one or more access devices, the SNMP agent is the only module configured to directly access the configuration data, and the SNMP agent transmits a first message to the combined hypertext transport protocol (HTTP) server and SNMP manager using HTTP;
the combined HTTP server and SNMP manager, wherein the combined HTTP server and SNMP manager only accesses said configuration data by communicating with said SNMP agent and wherein in response to said first message said combined HTTP server and SNMP manager transmits a second message to the combined text-interface generator and HTTP client using SNMP; and
the combined text-interface generator and HTTP client, wherein the combined text-interface generator and HTTP client only accesses said configuration data in response to said second message as specified by said user input by requesting said combined HTTP server and SNMP manager to communicate with said SNMP agent, so that all safety mechanisms are built into the SNMP agent to enhance security and wherein said text-based interface layer, said HTTP server interface layer and said SNMP agent interface layer reside in the access device.

13. The apparatus of claim 12, wherein the SNMP manager resides within a different access device of the one or more access devices than the SNMP agent and the configuration data.

14. The apparatus of claim 12, wherein the SNMP manager resides within a same access device of the one or more access devices as the SNMP agent and the configuration data.

15. A network device having one or more processing devices to implement code which when executed cause the one or more processors to perform the following comprising:
causing a second software layer to send a Hypertext Markup Language document to a first software layer;
executing said first software layer to generate a user interface based on said Hypertext Markup Language document;
said first software layer receiving user input that specifies a change to configuration data stored in said network device;
in response to said user input, said first software layer transmitting a first message to a second software layer using Hypertext Transport Protocol, wherein said second software layer resides in said network device;
in response to said first message, said second software layer transmitting a second message to a third software layer using Simple Network Management Protocol, wherein said third software layer resides in said network device; and
in response to said second message, said third software layer changing said configuration data as specified by said user input.

16. The network device of claim 15, wherein
said first software layer is a text-based interface layer to a combined text-based interface generator and hypertext transport protocol (HTTP) client, wherein
said second software layer is an HTTP server interface layer to a combined HTTP server and simple network management protocol (SNMP) manager, and wherein said third software layer is an SNMP agent interface layer.

17. The network device of claim 16, wherein causing said second software layer to send a Hypertext Markup Language document comprises:
receiving an object identifier for a Management Information Base object;
using said object identifier to search one or more files for entries associated with said Management Information Base object; and
for each entry associated with said Management Information Base object, generating Hypertext Markup Language text that, when decoded by an HTTP client, will cause the client to display information contained in said entry.

18. The network device of claim 16, wherein generating Hypertext Markup Language text for an entry comprises:
transmitting a query to said third software layer to retrieve a current value associated with a second Management Information Base object, said second Management Information Base object being a component of said Management Information Base object that is identified in said entry;
receiving from said third software layer said current value associated with said second Management Information Base object; and
generating Hypertext Markup Language text that, when decoded by an HTTP client, causes the HTTP client to generate a display that identifies said second Management Information Base object and displays said current value of said second Management Information Base object.

19. The network device of claim 18, wherein generating Hypertext Markup Language text for an entry further comprises generating an anchor that contains a second MIB object identifier, wherein said second MIB object identifier uniquely identifies said second MIB object.

20. The network device of claim 19, wherein the code further causes the one or more processors to perform the following comprising:
said second software layer receiving from said first software layer said second MIB object identifier and a new value for said second MIB object in response to a user selecting said display that identifies said second MIB object; and
said second software layer transmitting command to said third software layer to cause said third software layer to update configuration data associated with said second MIB object to said new value.

21. A network device having one or more processing devices to implement code which when executed cause the one or more processors to perform the following comprising:
executing a first software layer to generate a user interface, wherein said first software layer is a text-based interface layer to a combined text-based interface generator and hypertext transport protocol (HTTP) client;
said first software layer receiving user input that specifies a change to configuration data stored in said network device;
in response to said user input, said first software layer transmitting a first message to a second software layer using Hypertext Transport Protocol, wherein said second software layer is an HTTP server interface layer to a combined HTTP server and simple network management protocol (SNMP) manager and resides in said network device;
in response to said first message, said second software layer transmitting a second message to a third software layer using Simple Network Management Protocol, wherein said third software layer is an SNMP agent interface layer and resides in said network device; and
in response to said second message, said third software layer changing said configuration data as specified by said user input.

22. The network device of claim 21, wherein the code further causes the one or more processors to perform the following comprising:
causing said second software layer to send a Hypertext Markup Language document to said first software layer; and
generating, by the first software layer, said user interface based on said Hypertext Markup Language document.

* * * * *